(12) United States Patent
Reuter et al.

(10) Patent No.: US 11,001,718 B2
(45) Date of Patent: *May 11, 2021

(54) OPACIFYING CLUSTERS FOR USE IN PAINT COMPOSITIONS

(71) Applicant: THE SHERWIN-WILLIAMS COMPANY, Cleveland, OH (US)

(72) Inventors: James M Reuter, Cleveland Heights, OH (US); Joseph K Walker, Mentor, OH (US); Chase Banyots, Cleveland, OH (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,969

(22) Filed: Dec. 19, 2017

(65) Prior Publication Data

US 2018/0105707 A1 Apr. 19, 2018

Related U.S. Application Data

(63) Continuation of application No. 15/460,307, filed on Mar. 16, 2017, now abandoned.

(60) Provisional application No. 62/308,910, filed on Mar. 16, 2016.

(51) Int. Cl.
| | | |
|---|---|---|
| *C08K 3/26* | (2006.01) | |
| *C08K 3/34* | (2006.01) | |
| *C08K 3/36* | (2006.01) | |
| *C09D 127/06* | (2006.01) | |
| *C09D 5/02* | (2006.01) | |
| *C09D 7/20* | (2018.01) | |
| *C09D 7/40* | (2018.01) | |
| *C09D 7/41* | (2018.01) | |
| *C09D 7/61* | (2018.01) | |

(52) U.S. Cl.
CPC ............... *C09D 7/61* (2018.01); *C09D 5/028* (2013.01); *C09D 7/20* (2018.01); *C09D 7/41* (2018.01); *C09D 7/70* (2018.01); *C09D 127/06* (2013.01); *C08K 3/26* (2013.01); *C08K 3/34* (2013.01); *C08K 3/346* (2013.01); *C08K 3/36* (2013.01); *C08K 2003/265* (2013.01)

(58) Field of Classification Search
CPC ... C09C 1/0081; C09C 1/0084; C01P 2004/80
See application file for complete search history.

(56) References Cited

U.S. PATENT DOCUMENTS

| | | | |
|---|---|---|---|
| 3,726,700 A | 4/1973 | Wildt | |
| 4,148,101 A * | 4/1979 | Einhorn | B01F 5/10 366/251 |
| 4,166,811 A | 9/1979 | Marr et al. | |
| 4,391,928 A | 7/1983 | Herman et al. | |
| 4,474,911 A | 10/1984 | Smith et al. | |
| 5,082,887 A | 1/1992 | Brown et al. | |
| 5,147,458 A | 9/1992 | Skipper et al. | |
| 5,454,864 A * | 10/1995 | Whalen-Shaw | C08K 9/08 106/145.1 |
| 5,510,422 A | 4/1996 | Blankenship et al. | |
| 5,521,253 A | 5/1996 | Lee et al. | |
| 5,551,975 A | 9/1996 | Freeman et al. | |
| 5,643,974 A | 7/1997 | Simpson et al. | |
| 5,650,002 A | 7/1997 | Bolt | |
| 6,080,802 A | 6/2000 | Emmons et al. | |
| 6,149,723 A | 11/2000 | Pruett et al. | |
| 6,156,117 A | 12/2000 | Freeman et al. | |
| 8,227,542 B2 | 7/2012 | Bardman et al. | |
| 8,476,190 B2 | 7/2013 | Mukkamala et al. | |
| 8,808,855 B2 | 8/2014 | Gane et al. | |
| 8,822,569 B2 | 9/2014 | Bardman et al. | |
| 8,858,701 B2 | 10/2014 | Wilkenhoener et al. | |
| 8,906,982 B2 | 12/2014 | Bardman et al. | |
| 9,339,781 B2 | 5/2016 | Baker et al. | |
| 9,388,288 B2 | 7/2016 | Vanier et al. | |
| 9,441,102 B2 | 9/2016 | Brown | |
| 9,487,670 B2 | 11/2016 | Korenkiewcz et al. | |
| 2005/0006041 A1 | 1/2005 | Gane et al. | |
| 2006/0160921 A1 | 7/2006 | Ragone et al. | |
| 2009/0016238 A1 | 1/2009 | Yu | |
| 2014/0249241 A1 | 9/2014 | Vanier et al. | |

(Continued)

FOREIGN PATENT DOCUMENTS

| | | |
|---|---|---|
| EP | 0113435 A2 | 7/1984 |
| EP | 0700976 A2 | 3/1996 |

(Continued)

OTHER PUBLICATIONS

Office Action for Japanese patent application No. 2018-547464, dated Oct. 31, 2019 (12 pages, including English translation).
International Search Report for patent appl. No. PCT/US2017/022622, dated Jun. 12, 2017 (3 pages).
Written Opinion for patent appl. No. PCT/US2017/022622, dated Jun. 12, 2017 (5 pages).

* cited by examiner

*Primary Examiner* — Melissa A Rioja

(57) ABSTRACT

An opacifying cluster which may be added to a coating composition to provide a coating composition with low gloss and a high level of opacity. The opacifying cluster can include a polymeric latex binder coalescing cluster components into a generally homogeneous particle. The cluster components may include discrete polymeric particles each defining a closed void volume therein, a plurality of inorganic pigment particles, and a plurality of extender pigment particles. The clusters may also include a porosity of the polymeric latex binder thereof defining a binder void volume. Also provided is a paint product including such a pigment cluster.

28 Claims, 9 Drawing Sheets

(56) References Cited

U.S. PATENT DOCUMENTS

| | | |
|---|---|---|
| 2015/0166793 A1 | 6/2015 | Mersch et al. |
| 2015/0190320 A1 | 7/2015 | Tachon et al. |
| 2016/0090502 A1 | 3/2016 | Van Dyk et al. |
| 2016/0126502 A1* | 5/2016 | Furukawa ........... H01L 51/5268 257/40 |
| 2016/0355660 A1 | 12/2016 | Brick et al. |
| 2017/0068021 A1 | 3/2017 | Wilson |

FOREIGN PATENT DOCUMENTS

| | | |
|---|---|---|
| EP | 2578647 A1 | 4/2013 |
| JP | H07-503027 A | 3/1995 |
| JP | 2002511514 A | 4/2002 |
| JP | 2004501215 A | 1/2004 |
| JP | 2006052128 | 2/2006 |
| JP | 2009540035 | 11/2009 |
| JP | 2010090374 | 4/2010 |
| WO | 92/08755 A1 | 5/1992 |
| WO | 0001771 | 1/2000 |
| WO | 01/79606 A1 | 10/2001 |
| WO | 2007141260 | 12/2007 |
| WO | 2015038073 A1 | 3/2015 |
| WO | 2015/153429 A1 | 10/2015 |

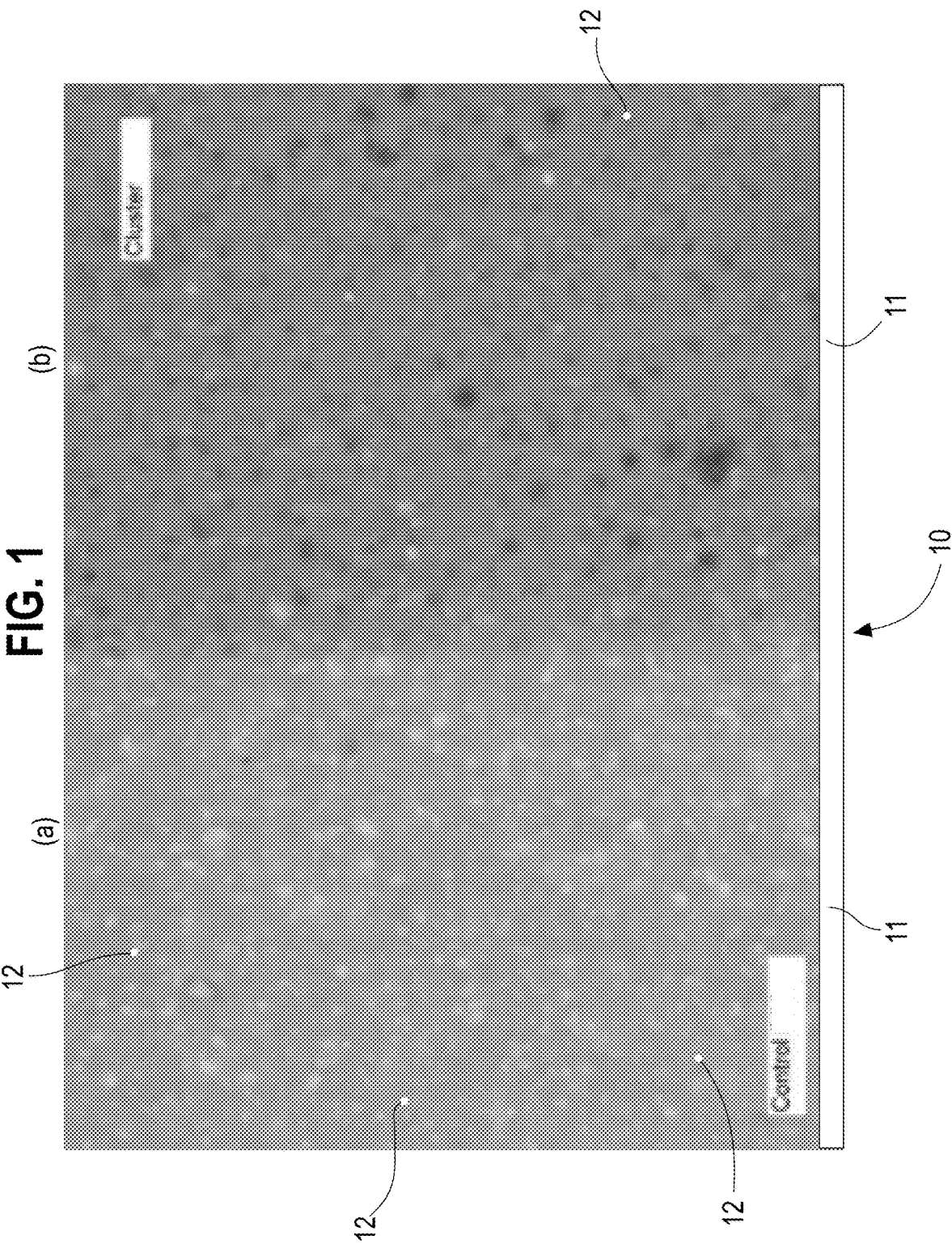

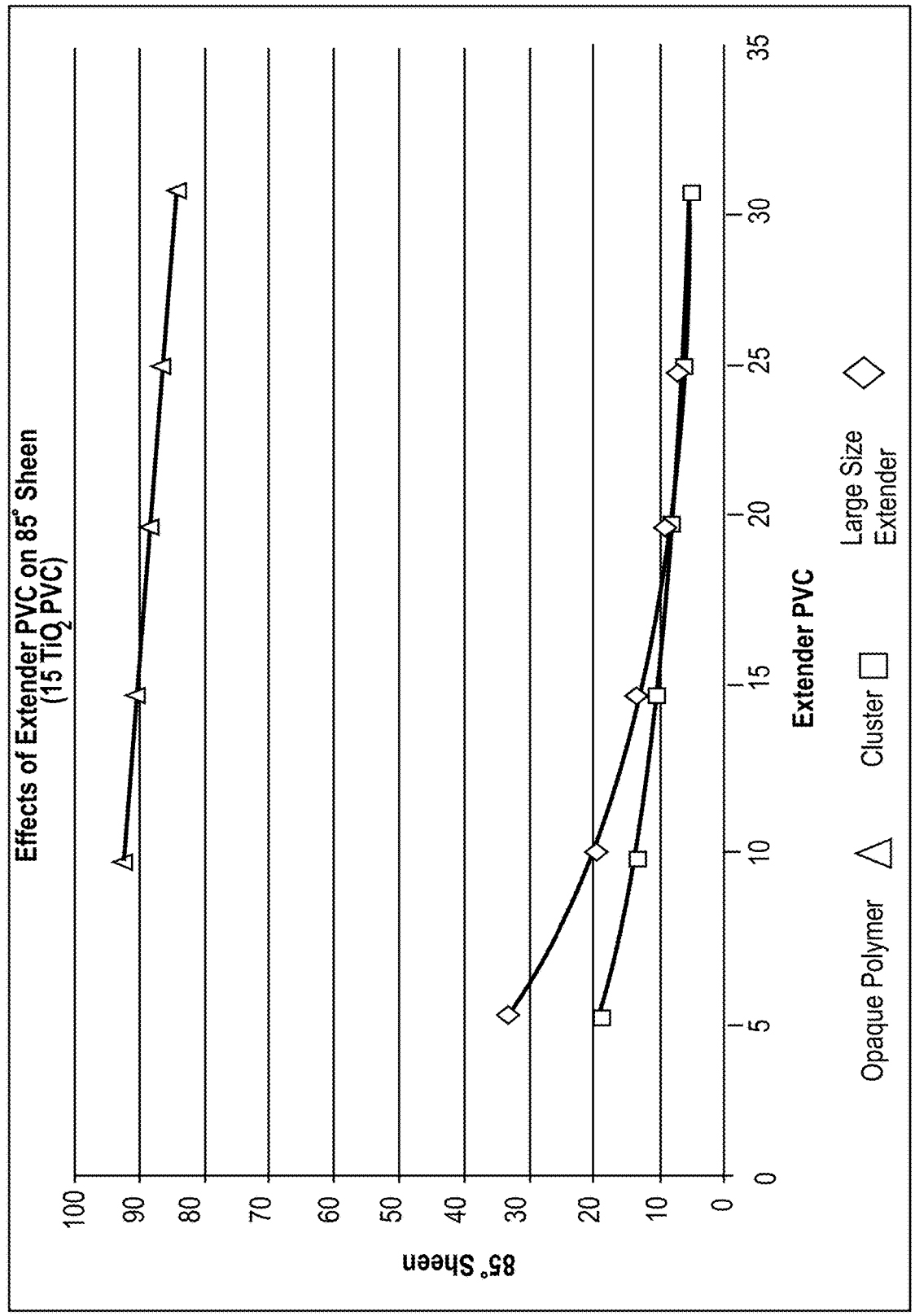

OPACIFYING CLUSTERS FOR USE IN PAINT COMPOSITIONS

CROSS-REFERENCE TO RELATED APPLICATIONS

This application is a continuation of U.S. application Ser. No.: 15/460,307, filed on Mar. 16, 2017, which claims priority to U.S. Provisional Application Ser. No. 62/308,910, filed on Mar. 16, 2016, each of which is incorporated herein by reference in its entirety.

BACKGROUND

1. Field

This disclosure relates generally to pigment clusters made from a binder, opaque polymer, pigment, and small-size extender. The pigment clusters may be used in a paint product or paint composition in place of at least a portion of large-size extender particles to improve the opacity of resultant films made using the paint product while maintaining the mechanical integrity and flatness of the resultant film relative to a film formed from a paint product that lacks the pigment clusters.

2. Description of Related Art

Professional and residential consumers of surface coatings, such as architectural paints, prefer paint products that require the fewest number of applications of paint to cover the surface underneath the paint being applied.

Certain architectural paints are required by the professional or residential customer to have a low gloss or flat finish. To achieve such low gloss or flat finishes, manufacturers often add large particle size extenders which may be ground up minerals (such as calcium carbonate) with an average particle size from about 5 µm to about 50 µm. Such large size extenders are preferred by manufacturers due to their relatively low cost and high efficacy at increasing the pigment volume concentration of a coating. However, when added to a paint product, the large size extenders cause $TiO_2$, which is nearly universally used in paint as a white opacifying pigment, or other pigment to crowd and such crowding decreases the efficiency of light scattering within the paint when it is applied as a surface coating. The large size extenders may also cause a reduction in opacity themselves by creating regions of low light scattering within the paint when it is applied as a surface coating. The consequence of having regions of low light scattering in a paint film is the appearance of microscopic inhomogenieties in the paint film. In other words, a coated surface will appear to have "spots" "windows" on it.

To reduce the negative perception of the appearance of transparent windows that occur in matte paints which are caused by the presence of these large size extenders, manufacturers may increase the amount of $TiO_2$ in the paint composition. However, this is not a preferred solution in part because of the high cost of $TiO_2$.

The use of clay particles which may have high refraction index oxides or $TiO_2$ mechanically attached to them is also commonly used in paint products as alternative large-size extenders. For example, in U.S. Pat. No. 3,726,700 to Wildt, the use of a composite pigment with clay particles having $TiO_2$ and other materials adhered to the clay particles as a pigment that has high hiding power when used in a paint is described. U.S. Pat. No. 5,551,975 to Freeman et al. describes pigments for paints which are the result of the reaction of clay with colloidal silica. While such clay-based pigments are important advancements as alternatives to large size extenders for the use in surface coatings, such clay-based pigments do not effectively increase the opacity of a paint film because clay-based pigments tend to uptake the other materials within the paint (e.g., solvent, latex, etc.) due to the large sized pores and high porosity of the surface of the clay and, as such, the composite particles tend to lose their void volume, which is a key requirement for increasing opacity in a paint film.

The use of vesiculated beads to increase the light scattering (or opacity) of a paint is described in U.S. Pat. No. 4,489,174 to Karickhoff. Such vesiculated beads may increase opacity by up to 15% at like $TiO_2$ concentrations when compared to a paint that has been traditionally formulated with only large size extenders. Such vesiculated beads are a continuous polymeric matrix that help improve the opacity and sheen qualities of a surface coating. The limitations of such vesiculated beads are that the beads tend to be costly due in part to the high concentration of polymer in the bead and are difficult to synthesize with uniformity which causes inconsistent light scattering efficiency and tint strength.

The use of larger pigment particles with a polymer that is covalently bonded to the pigment is described in U.S. Pat. No. 7,081,488 to Bardman et al. These polymer pigment particles purport to improve light scattering qualities of a paint coating. However, there is not any void space in such pigment particles and the cost of such pigment particles is relatively high.

BRIEF SUMMARY

According to one aspect, an opacifying cluster particle is provided that is suitable for latex paint compositions to provide increased opacity. The opacifying cluster particle includes a polymeric latex binder coalescing cluster components into a generally homogeneous particle. The cluster components include discrete polymeric particles each defining a closed void volume therein, a plurality of optional inorganic pigment particles, and a plurality of optional extender pigment particles. The polymeric latex binder further includes a porosity thereof defining a binder void volume of the cluster.

In yet other aspects, the opacifying cluster particle of the preceding paragraph may be combined with one or more optional features. For instance, the opacifying cluster particle may have a total void volume including a total closed void volume of all the discrete polymeric particle closed void volumes and the binder void volume of the polymeric latex binder; the total void volume may be from about 1 percent to about 35 percent by volume of the opacifying cluster particle; an average closed void volume of each discrete polymeric particle may be about 0.4 microns to about 03 microns in size; an average particle size of the opacifying cluster particle may be from about 5 microns to about 44 microns; the opacifying cluster particle may have an outer surface defined at least by a portion of the polymeric latex binder and wherein the outer surface has a surface porosity; the surface porosity may be formed by one or more interstices each from about 0.050 µm to about 0.150 µm in size; a glass transition temperature of the discrete polymeric particles may be greater than a glass transition temperature of the polymeric latex binder; the opacifying cluster may further include from about 1 percent to about 30 percent by volume of the polymeric latex binder, from about 10 percent to about 70 percent by volume of the discrete polymeric particles, from about 0 percent to about 6 percent by volume of the inorganic pigment particles; and the balance being the optional extender pigment particles; the pigment volume concentration in the opacifying cluster particle may be greater than or equal to the critical pigment volume concentration; the extender pigment particles may be about 0.1 to about 1 microns in size and selected from calcium carbonate, clay, silica, talc, and mixtures thereof; and/or the inorganic pigment particles may be about 0.1 to about 1.0 microns in size and selected from titanium dioxide, zinc oxide, and mixtures thereof.

In yet another aspect, a latex paint composition is described. In some aspects, the latex paint composition includes solvent (such as water), at least one first or primary polymeric binder, pigment particles, and a plurality of discrete opacifying cluster particles. Each discrete opacifying cluster particle may include a second polymeric latex binder coalescing cluster components into a generally homogeneous particle wherein the second polymeric latex binder is the same as or different from the at least one first polymeric binder. The cluster components include discrete polymeric particles each defining a closed void volume therein, a plurality of optional inorganic pigment particles, and a plurality of optional extender pigment particles. The polymeric latex binder in the cluster has a porosity thereof defining a binder void volume.

In other aspects, the latex paint composition of the preceding paragraph may also be combined with one or motion optional features. For instance, a pigment volume concentration of the discrete opacifying cluster particles in the latex paint composition may be below the critical pigment volume concentration; each opacifying cluster particle may include a total void volume including a total closed void volume of all the discrete polymeric particles closed void volumes and the binder void volume of the second polymeric latex binder; the total void volume may be from about 1% to about 35% by volume of the opacifying cluster; an average closed void volume of each discrete polymeric particle may be about 0.4 microns to about 0.7 microns in size; the pigment particles may include one of inorganic pigment particles, the latex paint composition may include additional discrete polymeric particles each defining a closed void volume therein not coalesced within the opacifying cluster particles, extender pigment particles not coalesced within the opacifying cluster particles, and mixtures thereof; the latex paint composition, when dried, may include about 50 to about 85 volume percent of the first or primary polymeric binder (15-50 PVC), about 0 to about 45 percent extender pigment particles not coalesced within the opacifying clusters particles, about 0 to about 20 volume percent discrete polymeric particles each defining a closed void volume therein not coalesced within the opacifying cluster particles, about 0 to about 20 volume percent inorganic pigment particles (such as titanium dioxide), and about 5 to about 50 volume percent opacifying cluster particles; the opacifying cluster particles may have an outer surface defined at least by a portion of the second polymeric latex binder and wherein the outer surface has a surface porosity; the surface porosity may be formed by interstices each averaging in size from about 0.050 microns to about 0.150 microns; a glass transition temperature of the discrete polymeric particles in the opacifying cluster particles may be greater than a glass transition temperature of the second polymeric latex binder in the opacifying cluster particles; each discrete opacifying cluster particle has an average particle size from about 5 microns to about 44 microns; each discrete opacifying cluster particle includes from about 1% to about 30% by volume of the second polymeric latex binder, from about 10 to about 70 percent by volume of the discrete polymeric particles, from about 0 to about 6 percent by volume of the inorganic pigment particles; and the balance being the extender pigment particles; and/or the pigment volume concentration in the discrete opacifying cluster particle may be greater than or equal to a critical pigment volume concentration.

In yet another aspect, a latex paint composition exhibiting improved contrast ratio and opacity is described herein. In some aspects, the latex paint composition includes at least solvent, a polymeric latex binder, optional pigment particles and a plurality of spray dried opacifying cluster particles. Each spray dried opacifying cluster particle includes discrete polymeric particles each defining a closed void volume therein coalesced into a generally homogeneous particle, optional polymeric binder, optional inorganic pigment particles, and optional pigment extender particles. The latex paint composition, when dried as a paint film, exhibits about 10 to about 35 percentage increase in opacity as compared to a latex paint composition with the same level of the pigment particles but not including the spray dried opacifying cluster particles.

In yet further aspects of the latex paint composition, the latex paint of the preceding paragraph may be combined with one or more further features. For instance, the latex paint composition may further exhibit about a one to about a two unit increase (on a 100 basis) or a 0.01 to a 0.02 unit increase (on a 1.0 basis) in contrast ratio as compared to a latex paint composition with the same level of the pigment particles but not including the spray dried opacifying cluster particles; the improvement in opacity may be exhibited over flat (matte), satins, and eg-shel latex paint compositions with a gloss value from about 0 to about 30 and a sheen value from about 0 to about 30; a dried latex paint composition may exhibit less than about 20 percent increase in gloss and less than about 50 percent increase in sheen upon 25 scrub cycles per the procedures of ASTM D6736-08; the latex paint composition may include less than about 10 weight percent of poly vinyl chloride particles (in other approaches, less than 5 percent, in other approaches, less than 1 percent, and in yet other approaches, no poly vinyl chloride particles); the latex paint composition may further exhibit an opacity factor of about 1:60 to about 1:90 in terms of a ratio of opacity to dry pigment ($TiO_2$) loading for a matte finish paint; the spray dried opacifying cluster particle may have a total void volume including a total closed void volume of all the discrete polymeric particle closed void volumes and the binder void volume of the polymeric latex binder; the total void volume may be from about 1 percent to about 35 percent by volume of the spray dried opacifying cluster particle; an average closed void volume of each discrete polymeric particle may be about 0.4 microns to about 0.7 microns in size; an average particle size of the spray dried opacifying cluster particle may be from about 5 microns to about 44 microns; the spray dried opacifying cluster particle may have an outer surface defined at least by a portion of the polymeric latex binder and wherein the outer surface has a surface porosity; the surface porosity may be formed by one or more interstices each from about 0.050 µm to about 0.150 µm in size; a glass transition temperature of the discrete polymeric particles may be greater than a glass transition temperature of the polymeric latex binder; the latex paint composition may further include from about 1 percent to about 30 percent by volume of the polymeric latex binder, from about 10 percent to about 70 percent by volume of the discrete polymeric particles, from about 0 percent to about 6 percent by volume of the inorganic pigment particles; and the balance being the pigment extender particles; the pigment volume concentration in the spray dried opacifying cluster is greater than or equal to the critical pigment volume concentration; the optional extender pigment particles are about 0.1 to about 1 microns in size and selected from calcium carbonite, clay silica, talc, and combinations thereof; and/or the latex paint composition may further include an opacity factor of about 1:60 to about 1:90 in terms of a ratio of opacity to dry pigment ($TiO_2$) loading.

In yet further aspects, a latex paint composition exhibiting improved contrast ratio and opacity over a wide range of gloss values and, in some instances, a wide range of pigment volume concentrations. In some approaches, the latex paint composition includes solvent, a polymeric latex binder, and pigment particles wherein the latex paint composition, when dried as a paint film, exhibits about 10 to about 35 percentage increase in opacity as compared to a latex paint composition with the same level of the pigment particles but not including the spray dried opacifying cluster particles; and wherein the improvement in opacity is exhibited over flat (matte), satins, and eg-shel latex paint compositions with a gloss value from about 0 to about 30 and a sheen value from about 0 to about 30. The latex paint composition may also include a plurality of spray dried opacifying cluster particles, wherein each spray dried opacifying cluster particle may include discrete polymeric particles each defining a closed void volume therein and coalesced into a generally homogeneous particle, optional polymeric binder, optional inorganic pigment particles, and optional pigment extender particles.

In yet other aspects, an additive for use in a coating composition is described herein where the additive includes a first component having a first refractive index, and a second component having a second refractive index. The first component and the second component are connected by a coalesced latex binder material.

The additive of the preceding paragraph may be combined with any of the optional features described in any of the above paragraphs and, for example, may further define the first refractive index from about 1 to about 1.5 and the second refractive index from about 1.5 to about 3.0; and/or wherein the difference in refractive indices between the first component and the second component is at least about 0.5 to about 2.0

BRIEF DESCRIPTION OF SEVERAL VIEWS OF THE DRAWING

The disclosure may take physical form in certain parts and arrangement of parts, embodiments of which will be described in detail in this specification and illustrated in the accompanying drawings which form a part hereof and wherein:

FIG. 1 shows a top view of: region (a), which is an exemplary embodiment of a surface coated by a paint having only large-size extenders, and region (b), which is an exemplary embodiment of a surface coated by a paint including opacifying clusters in place of at least a portion of the large-size extenders included in the paint shown in region (a);

FIG. 8 shows a graphical representation of the ability of opacifying clusters herein to reduce sheen similar to other large particle size extenders and as compared to prior opaque polymers inability to achieve such results.

Figure 2A:
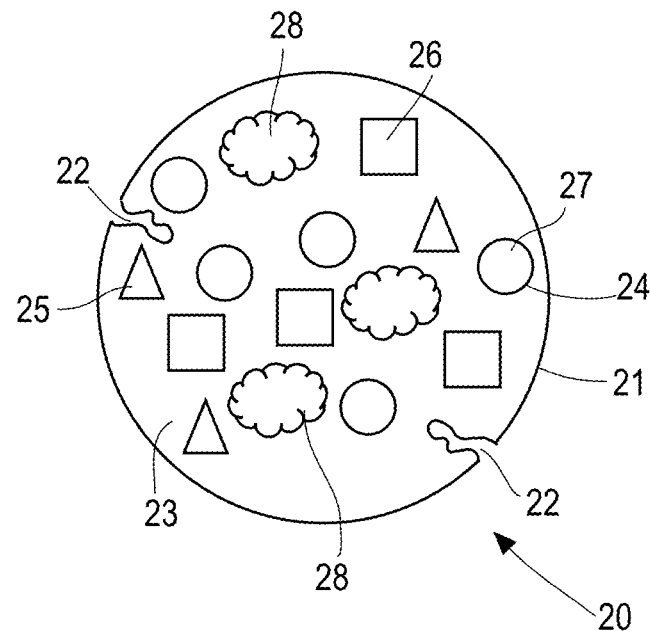
FIG. 2(a) shows a schematic, cross-sectional view of an exemplary embodiment of an opacifying cluster.

The drawings herein are not necessarily drawn to scale and schematic views do not necessarily represent the actual product or components thereof, but intended to generally represent various components thereof.

DETAILED DESCRIPTION

Certain terminology is used herein for convenience only and is not to be taken as a limitation on the present disclosure. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Glossary of Terms

"Opacity" as used herein refers to the ability of a film to scatter light based on the thickness of the film. The opacity is often expressed as S/mil and may be in the form of Kubelka-Munk scattering coefficients as determined using a modification of ASTM D2805-70 as described by J. E. McNult and H. L. Ramsey in American Paint and Coatings Journal, April 1988 p. 46 by the weight drawdown method, which is incorporated herein by reference.

"Opaque polymer" as used herein refers to a polymer or polymeric network that encloses or substantially encloses a defined volume. An opaque polymer may be a discrete polymeric particle where each polymer particle defines a closed void volume therein. In some embodiments, an opaque polymer comprises polystyrene. Opaque polymers are commercially available from commercial vendors. Exemplary commercially available opaque polymers are Ropaque Ultra EF and/or Ropaque OP-96 EF (both available from the Dow Chemical Company, Midland, Mich.). In certain embodiments the defined volume of an opaque polymer comprises air forming a void that scatters light. In certain other embodiments the defined volume of an opaque polymer comprises a liquid such as water. For embodiments including a liquid within the defined volume, the liquid is eventually replaced with air, creating a void that scatters light. Opaque polymers may be used as a partial replacement for $TiO_2$ in paints or other coatings to enhance hiding and whiteness in paints and coatings.

"Binder void volume" as used herein refers to the volume percentage of a coalesced polymer structure (such as a coalesced binder) that comprises air when applied as a part of a coating to a surface and dried.

"Opaque polymer void volume" as used herein refers to the volume of the void that is enclosed by, or substantially enclosed by, an opaque polymer.

"Void volume" or total void volume as used herein refers to the volume percentage of a material that comprises air when applied as part of a coating to a surface and dried. Void volume or total void volume is generally the sum of opaque polymer void volume and binder void volume.

"Pigment clusters" or opacifying cluster as used herein generally refers to different components, such as binder, opaque polymer, pigment, extenders, and/or other materials which may be used to enhance, or otherwise change the properties of, a paint composition wherein the components may be coalesced together into particles as are described herein. In some embodiments, pigment clusters and opacifying clusters are not held together with chemical bonding or covalent bonding. In other embodiments, components of pigment clusters and opacifying clusters (such as pigment) are not held to other components (such as binder) with hydrogen bonding or other types of bonding.

"Pigment volume concentration" or "PVC" as used herein refers to a number that represents the volume of pigment compared to the volume of all solids. In the field of paints and coatings, PVC is a useful measure because the binder acts as the material to unite all the pigment and other raw materials into the paint and the PVC value ensures there is enough binder to enable the paint to adhere properly to whatever it has been applied over in addition to containing all of the other components of the paint. If a paint has no pigment at all it will usually be very glossy and have a PVC of zero. An example is clear gloss paints. Flat paints have a very high pigment loading and have high PVCs (usually in the range from about 55% up to about 80%). Another non-limiting exemplary range of PVC in which pigment can be loaded is from about 60% to about 75%. Primers and undercoats vary from 30% to about 50% PVC as do semi-gloss, satin and low sheen paints, Gloss colored paints can vary from 3% to about 20% PVC depending on the color of the paint. Generally the darker the color of the gloss paint the lower the PVC. Additionally, it is thought that the lower the PVC of a paint is, the better its mechanical properties (such as tensile strength, and consequently, exterior durability) will be. PVC may be expressed as a percentage. For example, if a coating has a PVC of 30, then 30% of the total binder/pigment blend is pigment, and 70% is binder solids on a volume basis.

"Critical pigment volume concentration" or "CPVC" as used herein is the point at which there is just enough binder to wet (entirely surround) the pigment particles. As PVC reaches and then increases above CPVC, mechanical properties of the paint deteriorate. Above CPVC, with insufficient binder to satisfy pigment surface and fill interstitial spaces, air is introduced into the film resulting in a decrease in film integrity. However, above CPVC, increased air and pigment interface results in a substantial boost in pigment scattering efficiency. A film below the CPVC has excess resin and may exhibit a smooth surface that reflects light or appears to be glossy. As the PVC of a film approaches CPVC, the film will appear to be flatter, although the aforementioned loss of mechanical properties may become a limiting factor in how close to CPVC a paint producer wishes to provide the PVC.

"$Y_{black}$" as used herein represents the reflectance value of a coating and measures the ability of a coating to cover against a black background. Measurement of $Y_{black}$ may be done as part of measurement of contrast ratio.

"$Y_{white}$" as used herein represents the reflectance value of a coating and measures the ability of a coating to reflect light against a white background. Measurement of $Y_{white}$ may be done as part of measurement of contrast ratio.

"Contrast Ratio" as used herein is calculated as $Y_{black}/Y_{white}$ and is the ratio of the reflectance of a film on a black substrate to that of an identical film on a white substrate. ASTM D2805-11 provides for the measurement of contrast ratio.

"Binder" as used herein is a material that may be used to form a cluster from different components (ex., pigments, small sized extenders, and/or opaque polymers) by coalescing and mechanically connecting the components. Latex polymers are a non-limiting example of a binder that may be dispersed in water using a dispersant and film formation (or other network formation) occurs by joining (or coalescence) of these solid particles as water evaporates or is otherwise driven off. Exemplary binders which may be used in the present disclosure include, but are not limited to, polyvinyl acetates, vinyl acrylics, styrene butadiene, styrene acrylics, and ethylene vinyl acrylics. Other exemplary binders include, but are not limited to solvent-borne binders and water reducible binders.

"Small size extender" as used herein refers to particles of minerals, clay, ground and precipitated silica, or other fillers which may be used to reduce the quantity of the pigment required to achieve a desired hiding ability, sheen, etc., without significantly affecting the color of the paint established by the pigment, and having a particle size of from about 0.1 μm to about 1 μm. Small size extenders that may be purchased commercially include, but are not limited to Omyacarb UF (Omya North America). Extender pigment particles used within a cluster may be small size extender particles. Any suitable small size extender that one of skill in the art would use in a coatings application may be used in the coatings and paint products of the present disclosure without departing from the scope of the present disclosure.

"Large size extender" as used herein refers to particles of minerals, clay, or other fillers which may be used to reduce the quantity of the pigment required to achieve a desired hiding ability, sheen, etc., without significantly affecting the color of the paint established by the pigment, and having a particle size of greater than 5 μm. In some embodiments a large size extender is from about 5 μm to about 50 μm. In other embodiments, a large size extender is from about 10 μm to about 15 μm. Extender pigment particles not used or coalesced within an opacifying cluster, but otherwise added to a latex paint composition may be large size extender particles.

"Pore" or interstices as used herein is an opening at the surface of a structure such as a polymer, polymer cluster, or opacifying cluster. In one embodiment, a pore may form at the outer surface of an opacifying cluster and the components of the outer surface of an opacifying cluster may comprise components selected from the group consisting of: binders, opaque polymers, small-size extenders, pigments, and combinations thereof.

"Sheen" as used herein may also sometimes be referred to as "gloss". It is thought that because most extenders have a refractive index of light that is close to the refractive index of the binders of most coatings, below CPVC an extender/latex film will be largely transparent to visible light. In a coating, a gloss finish indicates that the surface which has a coating applied to it (i.e., is "finished") it is shiny or glass-like. The gloss of a surface is described as the reflection of light from the surface that is independent of color, ASTM D523 or D532-14 may be used to measure sheen. The prescribed angle at which light is reflected off the surface may vary, but for the purposes of this disclosure to measure 85 Sheen, is measured at 85° relative to the surface reflecting the light. ASTM D523 or D532-14 may also be used to describe 60 Gloss which is measured at 60° relative to the surface reflecting the light. One of skill in the art is able to determine relative levels of gloss (low versus high) in context of each coating.

"Paint" as used herein refers to any mixture comprising different types of raw materials, each with its own function, which must be balanced to achieve the desired properties in the final product or film coating. The two primary functions of paint are decoration and protection. A paint may contain a solvent (which can include a volatile component derived from a petroleum distillate for a solvent-based paint, or a low VOC, or no-VOC, or water for a water-based paint), a binder, a pigment, fillers (such as an extender or a plurality of extenders of different sizes) and an additive, which may impart different functionality to the paint or final coating. Embodiments may include an opacifying cluster as a component thereof, optionally in combination with at least one of the solvent, binder, pigment, filler and additive.

"Burnish" as used herein refers to the ability of a coating to retain its gloss value after being subjected to mechanical forces, such as abrasion. Burnish may be measured through ASTM D6736-08.

"Refractive Index" as used herein refers to a measurement that describes how light propagates through a material or medium. If needed, Refractive Index may be measured through one or more of ASTM D1218, D1747, or D542.

Opacifying Cluster Particle Constituents

The present disclosure is directed to compositions of, methods for using, and methods for making opacifying cluster particles that are compatible to form a component of surface coatings such as latex paints which provide, among other features, a surface film of low gloss and high opacity. The unique opacifying clusters of the present disclosure increase opacity with increasing PVC similar to the commonly used prior opaque polymers, but contrary to the prior opaque polymers, the opacifying clusters herein can also be used to reduce gloss and sheen (similar to large size extender particles) to achieve a matte or egg-shell finish. Thus, the clusters herein may be used over a wide range of gloss and sheen values not previously obtainable with conventional opaque polymers.

Turning to more of the specifics, FIG. 1 shows an exemplary top view of an applied film 10 of paint against a white backing 11 in region (a), which is shown extending beyond the lowermost boundary of the film 10 in FIG. 1 for illustrative purposes, wherein the applied film contains large size extenders and there is the appearance of windows 12 (shown as light spots in FIG. 1 relative to the surrounding film material) in the applied film 10. The formation of such windows is undesirable to users because of the need for additional coatings of paint to completely hide a substrate. Region (b) in FIG. 1 includes an applied film 10 against a white backing 11 similar to that in region (a), wherein the applied film 10 in region (b) is formed with a paint including the opacifying clusters disclosed herein. In the surface coating which is prepared including the opacifying clusters there is a greatly reduced appearance of windows 12 in the applied film 10, however, the complete absence of windows 12 is not required. In some embodiments the binder polymer is coalesced to form a network or backbone. In other embodiments the binder polymer is not covalently bonded to the other constituents. In certain embodiments the opaque polymer particles are discrete polymeric particles. In certain other embodiments the opaque polymer is processed with the outlet temperature being high enough (for example, above the glass transition temperature ($T_g$) of the opaque polymer), as described in detail below with respect to the Manufacture of Opacifying clusters. In yet other embodiments still, the opaque polymer is coalesced to other opaque polymer or binder.

FIG. 2(a) shows the cross sectional view of an exemplary embodiment of an opacifying cluster 20. The cluster 20 comprises a volume of binder material 23 having an outer surface 21 wherein the outer surface further comprises a plurality of interstices or pores 22. The plurality of pores 22 collectively establish the porosity of the opacifying cluster 20. In one embodiment the outer surface 21 comprises a binder material or polymeric latex binder. In another embodiment the outer surface comprises any number of components which may be selected from the group consisting of binders, opaque polymers, pigments, small-size extenders and combinations thereof. In some embodiments the interstices or pores 22 have a diameter or size of from about 0.050 µm to about 0.150 µm. In other embodiments the pores have a diameter or size of about 0.1 µm. Without wishing to be limited by theory, it is thought that because of the relatively small pore diameter or size and the relative tortuosity of the inner structure of an opacifying cluster 20, the latex from the paint solution does not enter into the voids (both the voids within the opacifying cluster 20 and the voids 28 in any binder) within the opacifying cluster 20 (i.e., the latex material does not displace the air inside the voids inside the opacifying cluster 20), thus preserving the optical qualities such as the light scattering ability of the opacifying cluster 20, rendering the opacifying cluster 20 an effective alternative to large-size extenders—unlike clays, for example, which are penetrated by the latex material from a paint solution, thus causing the clay particles to lose their optical qualities.

The opacifying cluster 20 further comprises binder material or polymeric latex binder 23 which mechanically coalesces or binds the various components of the opacifying cluster 20 to form a mixture, including an opaque polymer 24, small-size extender 25 (or extender pigment particles), and/or pigment 26 (or inorganic pigment particles). The opaque polymer 24 may comprise polymer which encloses or substantially encloses an opaque polymer void volume 27. The opaque polymer 24 may include discrete polymeric particles each defining a closed void volume therein. In some embodiments the polymer of the opaque polymer is polystyrene. Suitable opaque polymers may be available from commercial vendors such as Ropaque Ultra EF or Ropaque OP-96 EF (both available from the Dow Chemical Company, Midland, Mich.). In some embodiments the opaque polymer void volume 27 has a diameter or size from about 0.3 µm to about 0.8 µm. In other embodiments the opaque polymer void volume 27 has a diameter of from about 0.4 µm to about 0.7 µm. In other embodiments still the opaque polymer void volume 27 has a diameter of from about 0.5 µm to about 0.6 µm. In some embodiments the opaque polymer 24 has a polymer thickness of from about 0.075 µm to about 0.150 µm. In other embodiments the opaque polymer has a polymer thickness of from about 0.100 µm to about 0.120 µm. The opacifying cluster 20 also comprises a binder void volume 28 which is the result of empty spaces which form within the opacifying cluster 20 during formation of the cluster—for example, during spray drying.

Figure 2B:
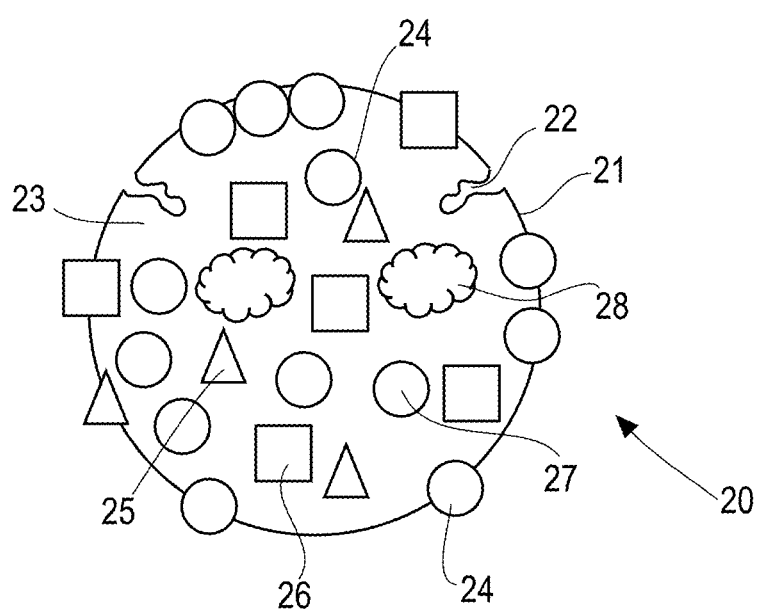
FIG. 2(b) shows a schematic, cross-sectional view of an alternative exemplary embodiment of an opacifying cluster.
Figure 4:
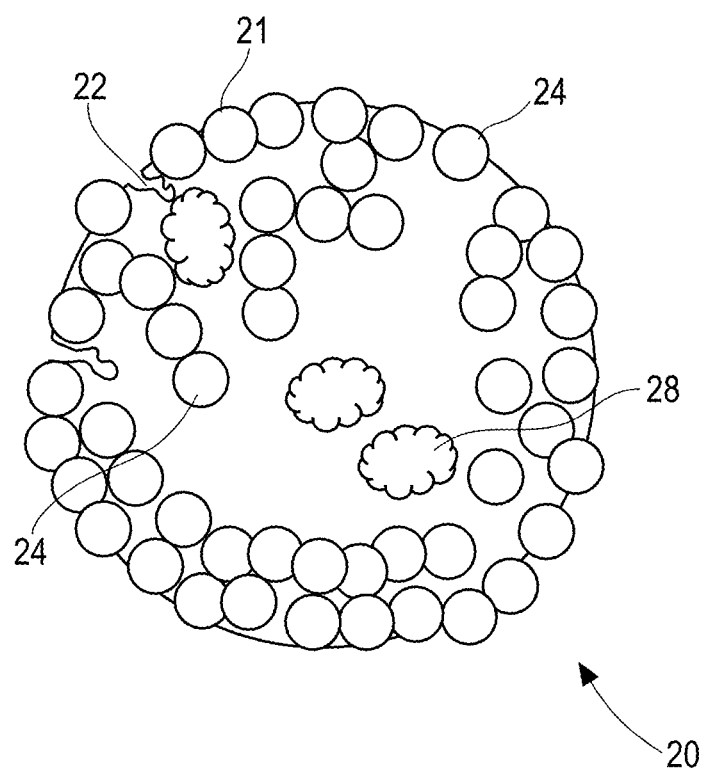
FIG. 4 shows a schematic, cross-sectional view of an alternative exemplary embodiment of an opacifying cluster.

FIG. 2(b) shows an alternative embodiment of an opacifying cluster 20 of the present disclosure. In the embodiment shown in FIG. 2(b) the outer surface 21 may comprise binder material 23 and opaque polymer 24, pigment 26, and small-size extender 25. As described in additional detail herein, the amount of polymer 24, pigment 26 and small-size extender 25 may vary from opacifying cluster to opacifying cluster and depends on the input feeds during the manufacture of the opacifying clusters. Surprisingly, it is discovered that not all components are necessary to provide functional opacifying clusters. For example, FIG. 4 shows yet an additional embodiment of an opacifying cluster 20 of the present disclosure. In the embodiment of FIG. 4 the opacifying cluster comprises only opaque polymer 24 which has been processed at a temperature that is significantly above $T_g$ of the opaque polymer 24.

The binder material or polymeric latex binder 23 may have a relatively low glass transition temperature ($T_g$) and in some embodiments the $T_g$ of the binder material 23 is from about 0° C. to about 60° C. In other embodiments the $T_g$ of the binder material 23 is from about 5° C. to about 60° C. In another embodiment still, the $T_g$ of the binder material 23 is from about 15° C. to about 50° C.

The opaque polymer 24 or the polymer of the discrete polymeric particles each defining a closed void volume therein may have a relatively high glass transition temperature ($T_g$) and in some embodiments the $T_g$ of the opaque polymer is from about 100° C. to about 120° C. In other embodiments the $T_g$ of the opaque polymer is from about 100° C. to about 110° C.

In some embodiments, the difference in $T_g$ of the binder 23 to the $T_g$ opaque polymer 24 is greater than 80° C. In other embodiments, the difference in $T_g$ of the binder to the $T_g$ opaque polymer is greater than 40° C. In other embodiments, still the difference in $T_g$ of the binder to the $T_g$ opaque polymer is greater than 10° C.

In some embodiments, the binder is a latex material. Exemplary binders which may be used in the present disclosure include, but are not limited to, polyvinyl acetates, vinyl acrylics, styrene butadiene, styrenes, styrene acrylics, ethylene vinyl acrylics. Other exemplary binders are solvent-borne binders and water reducible binders.

One suitable non-limiting example of a material to use as the pigment or inorganic pigment particle 26 is $TiO_2$. In other embodiments the pigment 26 comprises zinc oxide. It is to be understood, however, that the scope of the present disclosure is not limited to titanium dioxide or zinc oxide as the pigment and that any suitable material may be used. In some embodiments the pigment 26 has a diameter of from about 0.1 µm to about 1.0 µm. In other embodiments the pigment 26 has a diameter of from about 0.3 µm to about 0.5 µm.

In an embodiment, the small-size extender 25 (or extender pigment particles within the cluster) of the present disclosure could be $CaCO_3$. Other non-limiting examples of materials which may be used as small-size extenders are clay, silica (both ground and precipitated), a fine talc or any other small extender that may be used in the art, and combinations thereof. In some embodiments, the small-size extenders 25 are from about 0.1 µm to about 1.0 µm. In other embodiments, the small size extenders 25 are from about 0.3 µm to about 0.8 µm. In other embodiments, still the small size extenders 25 are from about 0.5 µm to about 0.7 µm. In some embodiments, the opacifying cluster 20 does not have any small-size extender 25.

The opacifying clusters 20 are formed through mechanical entanglement or coalescence of the binder and the constituents. In some approaches, there is no covalent or chemical bonding within the clusters. The formation of the opacifying clusters 20 via temperature elevation (using a method such as spray drying) provides for relatively uniform opacifying clusters 20. The opacifying clusters 20 also which have void volumes that comprise both opaque polymer void volume 27 and binder void volume 28 due to the water being driven out of the binder in the opacifying clusters 20. In certain non-limiting embodiments, the void volume is from about 1% to about 35% by volume of the opacifying cluster 20. In other non-limiting embodiments, the void volume is from about 15% to about 30% by volume of the opacifying cluster. In other non-limiting embodiments still, the void volume is from about 25% to about 30% by volume of the opacifying cluster.

In some exemplary opacifying clusters 20, the volume percentage of solids of pigment 26 in an opacifying cluster 20 is from 0 to about 6%. In other exemplary embodiments, the volume percentage of solids of pigment 26 in an opacifying cluster 20 is greater than or equal to CPVC. In still other embodiments, the volume percentage of solids of pigment 26 in an opacifying cluster is about 1 to about 6%, in other approaches, about 2 to about 4%, and in yet other approaches, about 2.5%.

In other exemplary embodiments, the volume percentage of solids of binder in an opacifying cluster 20 is from about 1% to about 30%. In another exemplary embodiment, the volume percentage of solids of binder in an opacifying cluster is from about 5% to about 30%.

Some embodiments of the present opacifying cluster 20 have a volume percentage of solids of opaque polymer 24 of from about 0% to about 90%. In other exemplary embodiments, the volume percentage of solids of opaque polymer 24 in an opacifying cluster 20 is from about 10% to about 70%. In other exemplary embodiments still, the volume percentage of solids of opaque polymer 24 in an opacifying cluster 20 is from about 30% to about 50%.

In some exemplary embodiments, the volume percentage of solids of small-size extender 25 is from about 0% to about 90%. In many embodiments the volume percentage of solids of small size extender 25 comprises the balance of the opacifying cluster.

In some exemplary approaches, the opacifying clusters may exhibit a density of about 7 to about 20 pounds/gallon. In other approaches, the opacifying clusters may exhibit a density of about 7 to about 15 pounds/gallon, and in yet other approaches, about 10 to about 12 pounds per gallon. It will be appreciated, that such exemplary densities apply to all the various approaches of opacifying clusters provided herein.

In some aspects, the opacifying clusters herein are structured or engineered composite particles including the various particle constituents or components described throughout this disclosure. The constituents or particle components are generally uniformly or homogeneously dispersed or spread consistently throughout the composite particle. In some approaches, the cluster particles are spray dried particles. In other words, and in some approaches, the composite particles of this disclosure are not a core/shell-type structure and are free-of or devoid of any coatings or surface layers thereof prior to being combined in a latex paint composition.

Manufacture of Opacifying Clusters

Figure 3:
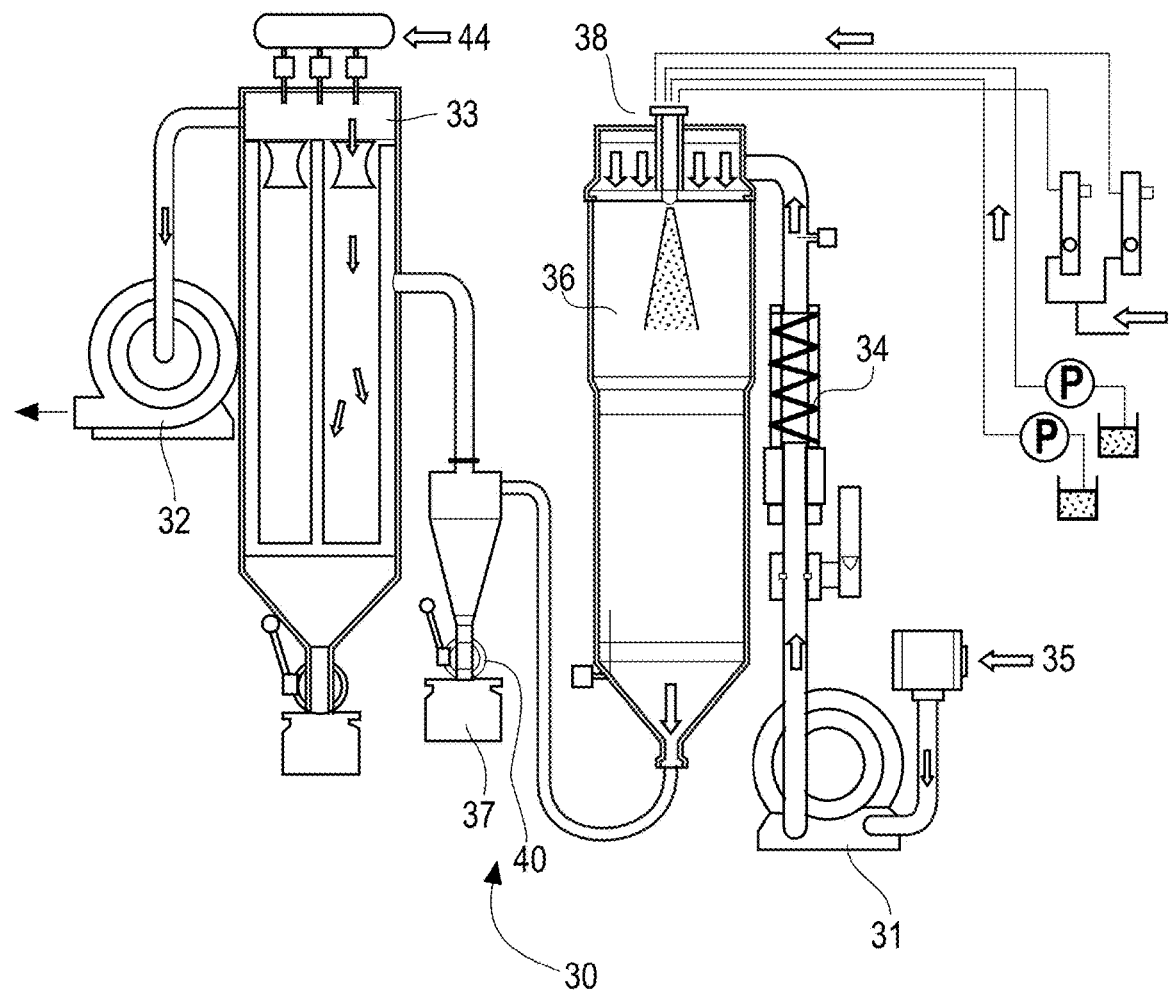
FIG. 3 shows a schematic view of equipment that may be used to produce opacifying clusters.

FIG. 3 provides a spray dryer 30 that may be used to manufacture the opacifying clusters of the present disclosure. According to the embodiment illustrated in FIG. 3, the spray dryer 30 includes an air supply blower 31 that feeds inlet air into a chamber 36 for atomizing a slurry comprising components to be included in the opacifying clusters 20, such as pigment 26, opaque polymer 24, and latex, for example. The air supply blower 31 can be a rotary, positive displacement fan, turbine, or any other suitable airflow device that can supply the volumetric flow rates into the chamber 36 to achieve the atomization described herein. An electric air heater 34 such as a radiant element, steam conduit, or other suitable heat source in thermal communication with the air supplied by the air supply blower 31 is operable to establish the desired temperature of the inlet air being introduced to the chamber 36 via a nozzle 38. The atomized slurry is drawn from the chamber 36 into a cyclone dryer 33 by a negative pressure established by an exhaust blower 32 which, like the air supply blower 31, can be a rotary, positive displacement fan, turbine, or any other suitable airflow device that can establish the exhaust volumetric flow rates described herein. Once through the chamber 36, the entrained opacifying clusters 20 in the form of a dry powder are removed from the airflow by a filter 33. The filter 33 can be any suitable separation device that can remove a substantial portion of the entrained powder from the airflow such as a cyclone separator, for example, that uses centrifugal force to expel the entrained produce radially outward, toward a perforated peripheral wall provided with a filter material, for example. The airflow can be occasionally interrupted to allow the particulate opacifying clusters 20 to be deposited into a collection container 37, which can be isolated from the system with a large ball valve 40 or other suitable flow control device.

A controller 39 is provided to control operation of the various components of the spray dryer 30 in accordance with the methods of manufacturing the opacifying clusters 20 described herein. An embodiment of the controller 39 generally includes a non-transitory, computer-readable medium 41 storing computer-executable instructions that, when executed by a computer processor 42, cause the controller 39 to communicate with the various operational components of the spray dryer 30 to manufacture the opacifying clusters 20 under the conditions described herein.

In use, the inlet air supply blower 31 and the exhaust blower 32 are started by the controller 39 to introduce a suitable amount of nozzle air to assist in atomization of the opacifying cluster slurry. Filters 33 on the spray dryer 30 are equipped with an air pulse mechanism 44 to occasionally release powder from filters 33. The electric air heater 34 is then set to deliver the desired temperature at the inlet 35.

When the temperature of the outlet of the chamber 36 reaches about 85° C. then water is pumped to the atomizer at a rate to maintain a constant outlet temperature. Once the spray dryer 30 has reached steady state with the desired outlet temperature with only water and atomization air, the water feed is switched to the slurry including the components to be included in the opacifying clusters 20. Once through the chamber 36, the resultant dry powder is separated in a cyclone and collected in a container 37 using the ball valve 40 or any other valve that may be well-suited for such an application.

FIG. 4 shows a cross-sectional view of an exemplary opacifying cluster 20 of the present disclosure, comprising only opaque polymer 24 which has been processed at a very high outlet temperature (above the $T_g$ of the opaque polymer 24) to coalesce the opaque polymers 24 together. In the opacifying cluster 20 shown, the opaque polymer 24 is distributed in a higher amount towards the outer surface 21 of the opacifying cluster 20 than within a central region of the opacifying cluster 20. Without wishing to be limited by theory, it is thought that during the manufacturing process, as water that acts as a carrier of the components into the spray dryer evaporates during the spray drying process, lighter and/or less dense components (such as opacifying clusters) are moved towards the outer surface, In other embodiments, binder material may also coalesce at the outer surface according to the same proposed principle.

Size Distribution of the Opacifying Cluster

An exemplary volume percentage of opacifying clusters 20 included in an illustrative embodiment of a paint composition is from about 50% to about 60%. In certain embodiments, the volume percentage of opacifying clusters in a paint composition is less than or equal to CPVC.

Figure 5:
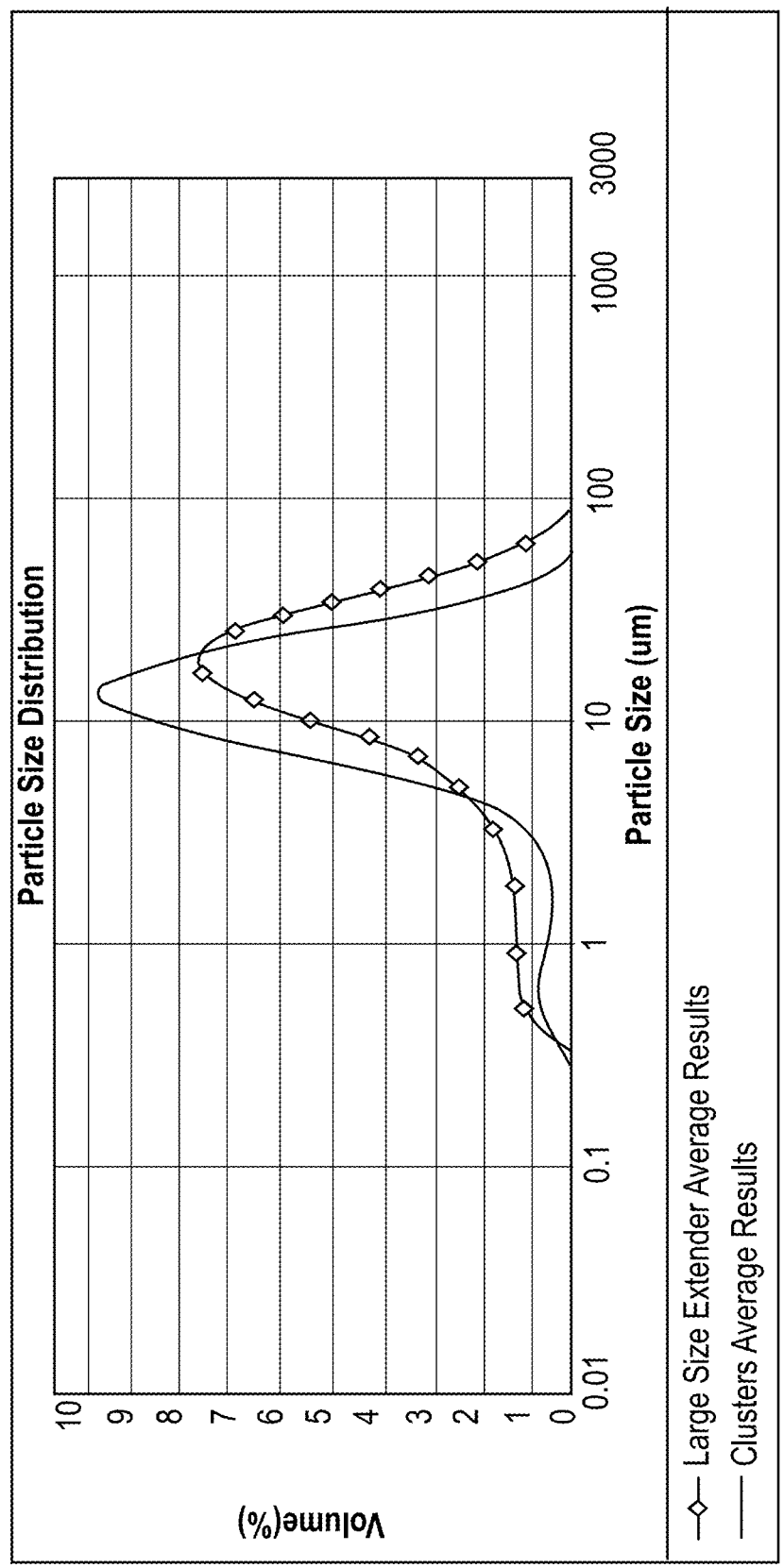
FIG. 5 shows a graphical representation of the size distribution of opacifying clusters compared to a large-size extender.

FIG. 5 shows the distribution of sizes of the opacifying clusters of the present disclosure as well as the distribution of particle sizes in exemplary large-size extenders (Duramite, available from Imerys Performance Materials, Roswell, Ga.) which are viable for commercial use. Surprisingly, it is found that the opacifying clusters made according to the present disclosure are substantially similar in size (i.e., have a relatively uniform size distribution) when compared to the exemplary large-size extenders. From FIG. 5 it is clear that the opacifying clusters of the present disclosure are substantially similar in size distribution to comparable commercially available large-size extenders. In one embodiment, the opacifying clusters have an average particle size of from about 5 μm to about 44 μm. In another embodiment, the opacifying clusters have an average particle size of from about 7 μm to about 30 μm. In another embodiment still, the opacifying clusters have an average particle size of from about 10 μm to about 20 μm. In yet another embodiment, the opacifying clusters have an average particle size of from about 10 μm to about 15 μm. It is highly desirable to provide consistently-sized and relatively small (greater than 325 mesh in size) extenders for an even, non-grainy, composition when the opacifying clusters are used in a paint coating.

Properties of the Composition

When added to a paint composition as a replacement for at least a portion, which can optionally be less than all, or optionally all of the large size extenders, the opacifying clusters of the present disclosure provide improved optical properties compared to a control paint composition which utilizes large size extenders that is devoid of the opacifying clusters described herein, Table 1 shows the comparison of an exemplary paint composition that includes opacifying clusters and a control paint composition that does not contain any opacifying clusters.

From Table 1 we can see that the paint clusters provide an improvement in the contrast ratio (Ca) and opacity (S) of the composition. In Table 1: NVV is volume solids, PVC is pigment volume concentration, extender and $TiO_2$ levels are expressed as pounds per 100 gallons or if easier divide by 100 to express as pound/gal. The $TiO_2$ is actually a 75% slurry (i.e., the actual level of $TiO_2$ may be calculated by multiplying the listed amount by 0.75). Y is the reflectance over white and black, respectively, and C/R is the contrast ratio.

TABLE 1

Performance Results of a Paint Composition Having Opacifying clusters

| Sample | Large-Size Extender | Opacifying cluster | $TiO_2$ slurry | NVV | PVC | $Y_{white}$ | $Y_{black}$ | C/R | Measured wt/gal | S/ mil | 60 gloss | 85 sheen |
|---|---|---|---|---|---|---|---|---|---|---|---|---|
| Control | 140 | 0 | 212 | 41.7 | 30.8 | 0.9079 | 0.8548 | 0.942 | 10.84 | 1.86 | 10.8 | 11.5 |
| Sample A | 0 | 75 | 212 | 41.7 | 30.8 | 0.9229 | 0.8879 | 0.962 | 10.32 | 2.47 | 10.6 | 12.2 |

The contrast ratio of Sample A is higher than the contrast ratio (C/R) of the Control that does not have the opacifying clusters. The opacity (S/mil) of Sample A is about 32% higher than the opacity of the Control.

Figure 6A:
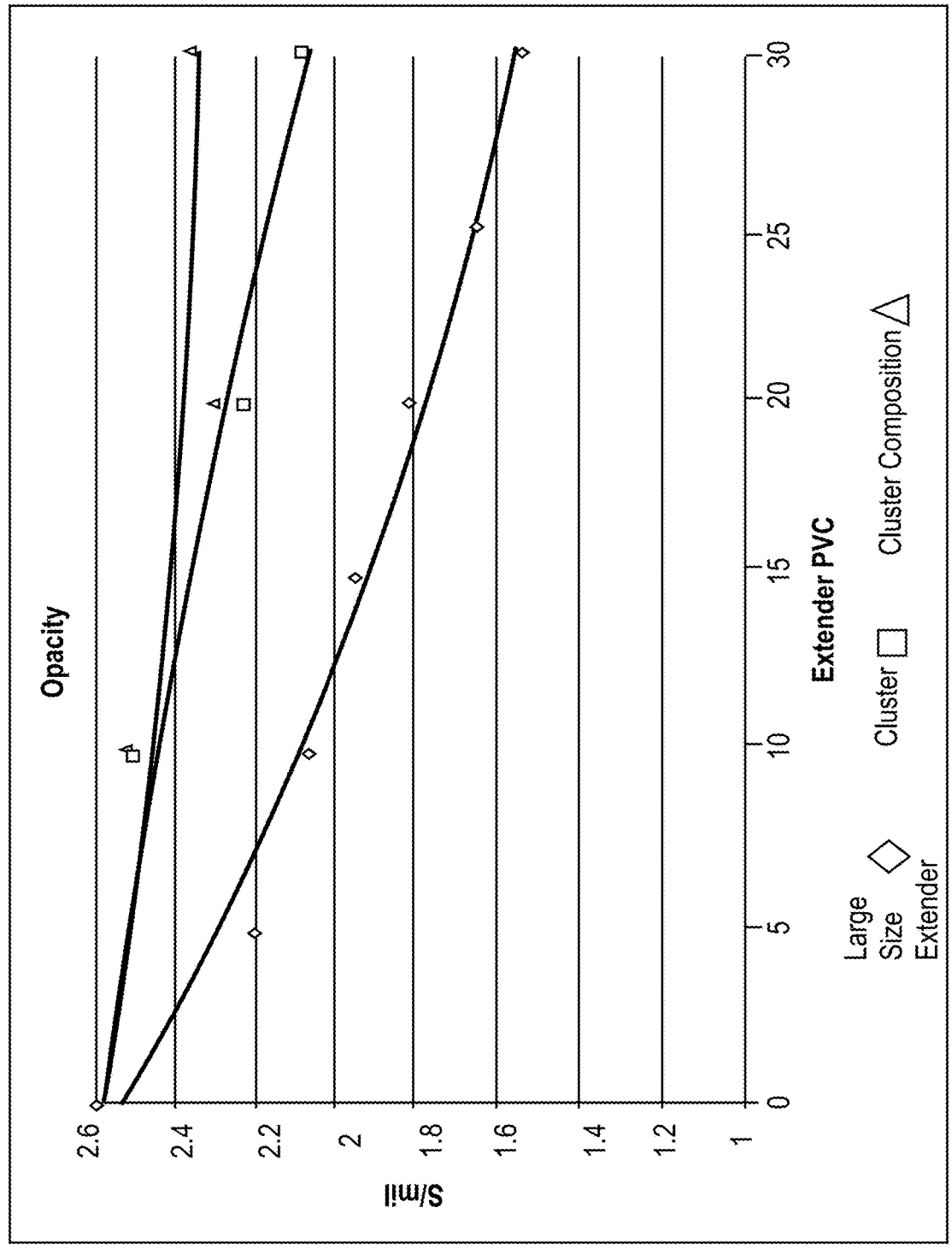
FIG. 6(a) shows a graphical representation of the opacity of the surfaces coated by paints having large-size extenders versus paints opacifying clusters.

FIG. 6(a) is a graphical representation of measurements of opacity of coatings applied from paint compositions containing exemplary opacifying clusters having 42.5 PVC opaque polymer, 42.5 PVC $CaCO_3$, 5 PVC $TiO_2$, and the balance of the opacifying cluster being latex versus an equal amount of ground calcium carbonate (used as a large-size extender). The paint used comprises about 38% binder, 10% water, 13% large size extender, 20% pigment slurry, and the balance being other additives. The x-axis is the extender PVC of the paint. The cluster composition of the graph is a paint with both clusters and large size extenders. From a paint formulation perspective, increasing PVC replaces latex with extender or opacifying clusters. Both the large-size extender and the opacifying clusters improves the opacity of the resultant coating.

Figure 6B:
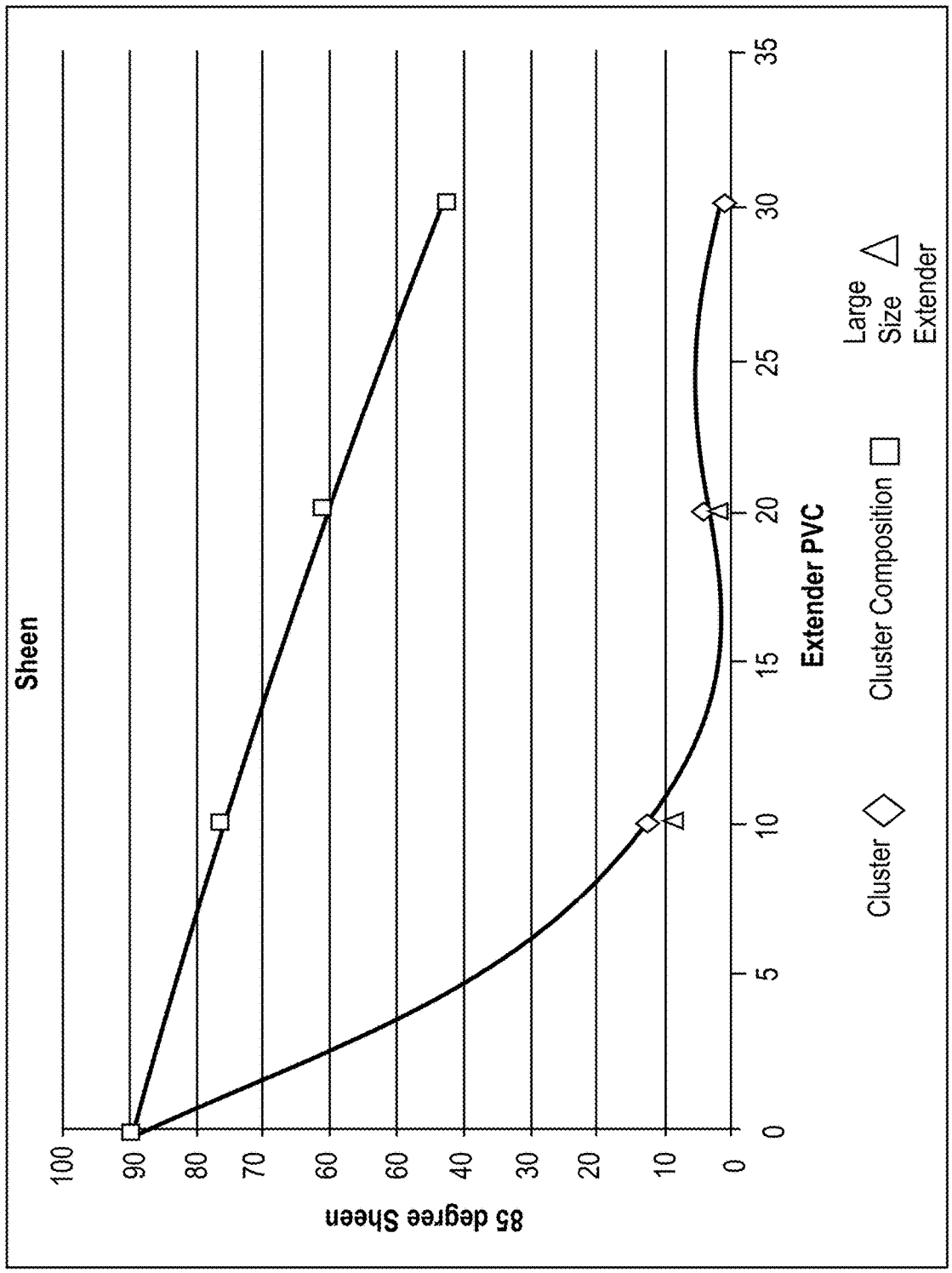
FIG. 6(b) shows a graphical representation of the sheen of representative surfaces coated by paints having large-size extenders versus paints having opacifying clusters.

FIG. 6(b) is a graphical representation of sheen measurements of the compositions described in FIG. 6(a). The composition that contains the large-size extender and the opacifying clusters (i.e., cluster composition) has a sheen that is relatively high whereas the composition that contains the opacifying clusters has a relatively low sheen.

An exemplary embodiment of a paint according to the present disclosure is a paint product comprising at least one solvent, at least one binder, at least one pigment and a PVC of opacifying clusters wherein the PVC of opacifying clusters in the paint is below CPVC. However, embodiments of the opacifying clusters comprise a PVC of pigment in the opacifying clusters that approaches CPVC.

In yet other aspects, the opacifying clusters herein may be structured or spray dried granular optical particles for use in coatings, such as latex paint compositions. The clusters may include different optically active components coalesced within the particle and with selected refractive indexes so that the opacifying cluster includes one or more discrete components with refractive indexes from 1 to 3.0. A difference of refractive index between the first component and the second component may be about 0.5 to about 2.0

For instance and in one approach, the opacifying clusters herein may include a first component or particle therein with a first refractive index. The first component or particle may have a refractive index of about 1.5 to about 3.0, in other approaches, about 1.5 to about 2.7, and in other approaches, about 2.0 to about 3.0. In some approaches, the first component may be an inorganic pigment particle such as titanium dioxide, latex binder, calcium carbonate and the like, and combinations thereof.

The opacifying cluster may also include a second component or particle with a second refractive index different than the first refractive index. The second component or particle may have a refractive index of about 1.0 to 2.0, in other approaches, 1.0 to about 1.5, and in other approaches, 1.2 to about 2.0, and in yet other approaches, 1.0 to 1.2. In some approaches, the second component may be a discrete polymer particles defining an internal void of air or water. In other approaches, the second component may be an opaque polymer. The internal void of the second component may be 0.3 to about 0.8 microns in size, In some approaches, the cluster may include yet another or third component or particle with a third refractive index that may be the same as to different than either the first or second refractive index, The third component may have a refractive index from about 1.4 to about 2.0. The third component may be a small size extender particle. The first, second, and third components or particles may be coalesced into a composite particle by a latex binder.

EXAMPLES

The practice and advantages of the opacifying clusters and latex paint compositions including such clusters may be demonstrated by the following examples, which are presented for purposes of illustration and not limitation. Unless otherwise indicated, all amounts, percentages, and ratios are by weight.

Example 1

An exemplary opacifying cluster is prepared by spray drying a 50% solids slurry of Omyacarb UF, OP-96, $TiO_2$ and Latex. On a volume basis, the finished cluster comprises 42.5 Omyacarb UF, 42.5% OP-96, 5% $TiO_2$ and 10% latex binder. The average particle size of the Opacifying clusters measured using a Malvern Mastersizer (Malvern Instruments, Malvern, UK) is 12 microns.

Example 2

Another exemplary opacifying cluster is prepared by spray drying a 44% solids slurry of hydrite clay, OP-96, $TiO_2$ and latex. On a volume percentage of solids basis, the finished cluster comprises 37.5% clay, 37,5% OP-96, 5% $TiO_2$ and 20% latex binder. The average particle size of the Opacifying clusters is 12.7 microns.

Example 3

Another exemplary opacifying cluster is prepared by spray drying a 50% solids slurry of Omyacarb UF, OP-96 and latex. On a volume percentage of solids basis, the finished cluster comprises 30% Omyacarb UF, 60% OP-96 and 10% latex binder. The average particle size of the Opacifying clusters is 14.6 microns.

Example 4

Another exemplary opacifying cluster is prepared by spray drying a 31% solids slurry of OP-96 and latex. On a volume percentage of solids basis, the finished cluster comprises 90% OP-96 and 10% latex binder. The average particle size of the Opacifying clusters is 13.2 microns.

Example 5

Another exemplary opacifying cluster is prepared by spray drying a 60% solids slurry of Omyacarb UF, $TiO_2$ and latex. On a volume percentage of solids basis, the finished cluster is composed of 85% Omyacarb UF, 5% $TiO_2$ and 10% latex binder, The average particle size of the Opacifying clusters is 12.7 microns.

Examples 6-17

The properties of opacifying clusters versus a commercially available large-size extender is $CaCO_3$ (Duramite) is shown in the table. The composition of the exemplary opacifying clusters is provided in the table. $CaCo_3$ as used in the opacifying clusters is Omyacarb UK Opaque polymer commercially available from Dow is used in each sample. The balance of the composition of each sample is latex binder. The paint used comprises about 38% binder, 10% water, 13% large size extender (or equivalent opacifying cluster amounting to the 6.2 gallons provided in Table 2 below), 20% pigment slurry, and the balance being other additives.

ing PVC while increasing the amount of large size extenders leads to a dramatic decrease in opacity. The drop in opacity with increasing volume of large size extenders may be due to the large windows that such extenders form in the paint. FIG. 8 illustrates the unique ability of the opacifying clusters herein to also function similar to large size extenders to decrease sheen. Conventional opaque polymers, as also shown in FIG. 8, are not able to decrease sheen like the opacifying clusters of the present disclosure and prior large size extenders. The composition of the opacifying clusters used for FIGS. 7 and 8 includes 2.5% $TiO_2$, 58.3% opaque polymer, 29.2% calcium carbonate, and 10% binder.

Example 19

The opacifying clusters herein also achieve the increased opacity with desired burnish levels at the same time. Such burnish levels can also be achieved with decreasing or removing completely the levels of commonly used durability increasing particles, such as polyvinyl chloride particles (PVC particles, Geon 215, PolyOne Corporation, about 22 microns average size) to provide improved burnish.

For this example, spray dried opacifying clusters (SD clusters) were prepared with about 29 volume percent small size extender (calcium carbonate), 58.4 volume percent opaque polymer (Ropaque 96), about 2.5 volume percent titanium dioxide, and 10 volume percent latex were prepared according to the present disclosure. The SD clusters for this

TABLE 2

Properties of Various Extenders and/or Opacifying clusters

| Sample | Composition (Percentage CaCo3/Opaque Polymer/TiO2) | Pounds of Sample Needed To Provide 6.2 Gallons of Extender | Thickness of Applied Coating (mils) | Y-Value (white) | Y-Value (black) | Contrast Ratio | S/Mil | Gloss | Sheen |
|---|---|---|---|---|---|---|---|---|---|
| Duramite | 100/0/0 | 140 | 2.5 | 0.9079 | 0.8548 | 0.942 | 1.86 | 10.8 | 11.5 |
| Example 6 | 42.5/42.5/5 | 89 | 2.5 | 0.9239 | 0.8881 | 0.961 | 2.43 | 7 | 7.3 |
| Example 7 | 37.5/37.5/5 | 79 | 2.5 | 0.9204 | 0.8844 | 0.961 | 2.41 | 7.3 | 8.6 |
| Example 8 | 45/45/0 | 83 | 2.5 | 0.9147 | 0.8754 | 0.957 | 2.18 | 7.9 | 8.6 |
| Example 9 | 30/60/0 | 73 | 2.5 | 0.9182 | 0.8797 | 0.958 | 2.27 | 7.4 | 6.2 |
| Example 10 | 0/90/0 | 51 | 2.5 | 0.9256 | 0.8901 | 0.962 | 2.49 | 10.6 | 11.8 |
| Example 11 | 43.75/43.75/2.5 | 85 | 2.5 | 0.9221 | 0.8854 | 0.960 | 2.33 | 9.8 | 11.3 |
| Example 12 | 29.1/58.4/2.5 | 75 | 2.5 | 0.9229 | 0.8879 | 0.962 | 2.47 | 10.6 | 12.2 |
| Example 13 | 0/85/5 | 57 | 2.5 | 0.9280 | 0.8942 | 0.964 | 2.59 | 11 | 14 |
| Example 14 | 42.5/42.5/5 | 90 | 2.5 | 0.9209 | 0.8841 | 0.960 | 2.43 | 10 | 14 |
| Example 15 | 30/60/0 | 51 | 2.5 | 0.9190 | 0.8775 | 0.955 | 2.25 | 8.6 | 9 |
| Example 16 | 85/0/5 | 111 | 2.5 | 0.9184 | 0.8759 | 0.954 | 2.25 | 32 | 63 |
| Example 17 | 80/0/5 | 118 | 2.5 | 0.9182 | 0.8748 | 0.953 | 2.19 | 13 | 17 |

Example 18

Figure 7:
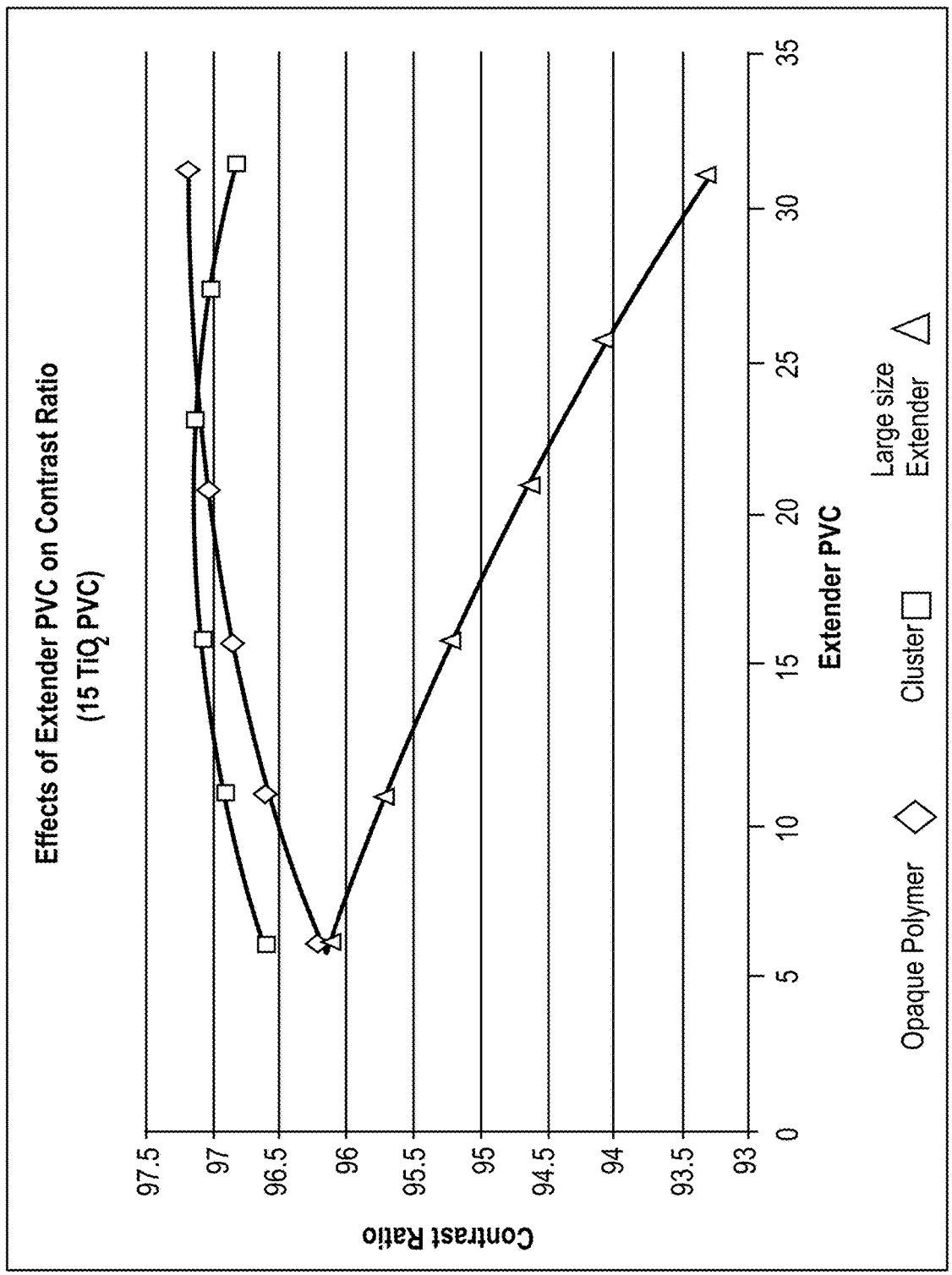
FIG. 7 shows a graphical representation of the ability of clusters to provide opacity similar to prior opaque polymers and relative to the inability of large size extenders to improve opacity.

A comparison of opacifying clusters of the present disclosure to conventional opaque polymers (Ropaque) and conventional large size extenders (Duramite) in latex paint compositions was conducted. FIGS. 7 and 8 illustrate opacity in terms of contrast ratio and sheen relative to increasing PVC of the latex paint compositions. FIG. 7 illustrates the ability of conventional opaque polymer and opacifying clusters herein to maintain or increase opacity with increas- Example had an average particle size of about 22 microns, which is similar to the Geon particles. The clusters were added to a latex paint composition. The latex paint composition also included large size extenders (Minspar 4, the Quartz Corporation, about 7 microns average size), and opaque polymer (Ropaque 96). Tables 3 to 6 provide the composition of evaluated latex paints, opacity values, and burnish testing of the exemplary clusters as compared to control paints using the Geon polyvinyl chloride particles instead.

TABLE 3

Latex Paint Compositions

| ID | Sample | Extender | Geon | SD Clusters (22 microns) | Opaque Polymer | TiO2 (slurry)* | TiO2 (dry) | NVV |
|---|---|---|---|---|---|---|---|---|
| A | Control | 90 | 50 | 0 | 85 | 300 | 0 | 41.1 |
| B | 18 | 90 | 0 | 51.5 | 85 | 300 | 0 | 41.1 |
| C | 19 | 90 | 0 | 71.4 | 85 | 225 | 0 | 41.1 |
| D | Control | 30 | 55 | 0 | 0 | 0 | 45 | 33.3 |
| E | 20 | 30 | 0 | 56.6 | 0 | 0 | 45 | 33.3 |
| F | Control | 60 | 19 | 0 | 89.7 | 280 | 0 | 38.8 |
| G | 21 | 60 | 0 | 19.6 | 89.7 | 280 | 0 | 38.8 |
| H | Control | 35.5 | 20 | 0 | 0 | 0 | 50 | 32.7 |
| I | 22 | 35.5 | 0 | 20.6 | 0 | 0 | 50 | 32.6 |

*75% slurry (amount of TiO2 may be calculated by multiplying the listed amount by 0.75.)

TABLE 4

Opacity

| ID | Sample | PVC | y-value (white) | Y value (black) | C/R | s/mil | 60 gloss | 85 sheen | Opacity Factor (Opacity/Dry TiO$_2$) |
|---|---|---|---|---|---|---|---|---|---|
| A | Control | 38.8 | 0.919 | 0.874 | 0.952 | 2.11 | 5 | 3.6 | 1:106 |
| B | 18 | 49.3 (38.8) | 0.925 | 0.893 | 0.965 | 2.56 | 4.6 | 3.8 | 1:87 |
| C | 19 | 49.3 (38.8) | 0.915 | 0.88 | 0.961 | 2.51 | 4.1 | 2.6 | 1:66 |
| D | Control | 9 | 0.868 | 0.648 | 0.746 | 0.49 | 6.7 | 2.9 | 1.91 |
| E | 20 | 23.1 (9.0) | 0.871 | 0.701 | 0.805 | 0.72 | 5.6 | 2.9 | 1:62 |
| F | Control | 37.2 | 0.923 | 0.888 | 0.962 | 2.56 | 10.5 | 13.9 | 1:82 |
| G | 21 | 4.17 (37.2) | 0.928 | 0.899 | 0.969 | 2.64 | 9.1 | 11.6 | 1:79 |
| H | Control | 10.6 | 0.866 | 0.682 | 0.788 | 0.63 | 14 | 13.4 | 1:79 |
| I | 22 | 15.9 (10.6) | 0.869 | 0.7005 | 0.812 | 0.75 | 12.7 | 12.1 | 1:66 |

TABLE 5

Burnish at 60 gloss

| Sample | 60 gloss (initial) | 60 gloss (5 cycles) | 60 gloss (25 cycles) | % Increase (5 cycles) from Initial | % increase (25 cycles) from Initial |
|---|---|---|---|---|---|
| Control | 5.3 | 5.7 | 5.9 | 8% | 11% |
| 18 | 5 | 5.4 | 5.7 | 8% | 14% |
| 19 | 4.2 | 4.4 | 4.6 | 5% | 10% |
| Control 20 | — | — | — | — | — |
| Control 21 | 10.6 | 12.2 | 12.2 | 15% | 15% |
| 21 | 9.2 | 10.6 | 10.8 | 15% | 17% |
| Control 22 | — | — | — | — | — |

TABLE 6

Burnish at 85 Sheen

| Sample | 85 Sheen (initial) | 85 Sheen (5 cycles) | 85 sheen (25 cycles) | % Increase (5 cycles) from Initial | % increase (25 cycles) from Initial |
|---|---|---|---|---|---|
| Control | 3.7 | 4.4 | 5.1 | 19% | 38% |
| 18 | 3.8 | 4.8 | 5.1 | 26% | 34% |
| 19 | 2.7 | 3.5 | 4.1 | 30% | 52% |
| Control 20 | — | — | — | — | — |
| Control | 13.5 | 14.7 | 15.1 | 9% | 12% |
| 21 | 11.5 | 12.9 | 13.3 | 12% | 16% |
| Control 22 | — | — | — | — | — |

As shown, sample 18 achieves a better opacity in terms of contrast ratio (C/R) than its control (line above it) with the same paint composition but without the clusters and using Geon instead. Sample 19, which reduces the level of TiO2 as compared to the control and sample 18, still achieves a better opacity than its control. Similar opacity results are shown relative to controls for samples 20, 21, and 22. All invective samples achieved the desired opacity while maintaining acceptable burnish levels without the poly vinyl chloride durability particles. Sample IDs A to E are matte finish and F to I are satin finish.

Example 20

Another example comparing opacifying clusters of the present disclosure to latex paint compositions including or free of polyvinyl chloride particles similar to Example 19 was performed. For this Example, the opacifying clusters were of the same composition of Example 19, but had an average particle size of about 17 microns. Tables 7 to 10 provide the results.

TABLE 7

Latex Paint Compositions

| Sample | Extender | Geon | SD Clusters (17 microns) | Opaque Polymer | TiO2 (slurry)* | TiO2 (dry) | NVV |
|---|---|---|---|---|---|---|---|
| Control | 90 | 50 | 0 | 85 | 300 | 0 | 41.1 |
| 23 | 90 | 0 | 51.5 | 85 | 300 | 0 | 41.1 |
| 24 | 125 | 0 | 51.5 | 85 | 225 | 0 | 41.1 |
| 25 | 125 | 0 | 66.3 | 63.7 | 225 | 0 | 41.1 |
| 26 | 125 | 0 | 81.1 | 42.5 | 225 | 0 | 41.1 |
| 27 | 125 | 0 | 95.8 | 21.2 | 225 | 0 | 41.1 |
| Control | 60 | 19 | 0 | 89.7 | 280 | 0 | 38.8 |
| 28 | 60 | 0 | 19.6 | 89.7 | 280 | 0 | 38.8 |

*75% slurry (amount of TiO2 may be calculated by multiplying the listed amount by 0.75.)

TABLE 8

Opacity

| Sample | PVC | y-value (white) | Y value (black) | C/R | s/mil | 60 gloss | 85 sheen |
|---|---|---|---|---|---|---|---|
| Control | 38.8 | 0.919 | 0.877 | 0.954 | — | 5 | 4 |
| 23 | 49.3 (38.8) | 0.927 | 0.893 | 0.964 | — | 5 | 5 |
| 24 | 49.2 (38.8) | 0.92 | 0.877 | 0.953 | — | 4.9 | 4.9 |
| 25 | 49.2 (38.8) | 0.92 | 0.879 | 0.955 | — | 4.3 | 3.8 |
| 26 | 49.2 (38.8) | 0.92 | 0.877 | 0.953 | — | 3.7 | 3.1 |
| 27 | 49.2 (38.8) | 0.922 | 0.878 | 0.953 | — | 3.4 | 2.6 |
| Control | 37.2 | 0.924 | 0.887 | 0.96 | — | 11 | 16 |
| 28 | 4.17 (37.2) | 0.926 | 0.893 | 0.964 | — | 10 | 14 |

TABLE 9

Burnish at 60 Gloss

| Sample | 60 gloss (initial) | 60 gloss (5 cycles) | 60 gloss (25 cycles) | % Increase (5 cycles) from Initial | % increase (25 cycles) from Initial |
|---|---|---|---|---|---|
| Control | 4.9 | 5.4 | 5.6 | 10% | 14% |
| 23 | 4.8 | 5.3 | 5.6 | 10% | 17% |
| Control | 5.2 | 5.6 | 5.9 | 8% | 13 5 |
| 24 | 4.6 | 4.9 | 5 | 7% | 9% |
| 25 | 4.1 | 4.2 | 4.3 | 2% | 5% |
| 26 | 3.4 | 3.6 | 3.7 | 6% | 9% |
| 27 | 3.2 | 3.2 | 3.3 | 0% | 3% |
| Control | 9.7 | 11.3 | 11.7 | 16% | 21% |
| 28 | 8.9 | 10.2 | 10.4 | 15% | 17% |

TABLE 10

Burnish at 85 Sheen

| Sample | 85 Sheen (initial) | 85 sheen (5 cycles) | 85 Sheen (25 cycles) | % Increase (5 cycles) from Initial | % increase (25 cycles) from Initial |
|---|---|---|---|---|---|
| Control | 43.5 | 4.5 | 4.9 | 29% | 40% |
| 23 | 4.6 | 6.1 | 6.8 | 33% | 48% |
| Control | 3.6 | 4.3 | 4.5 | 19% | 25% |
| 24 | 4.3 | 5.2 | 6 | 21% | 40% |
| 25 | 3.4 | 4.6 | 5.1 | 35% | 50% |
| 26 | 2.7 | 3.8 | 5.2 | 41% | 93% |
| 27 | 2.4 | 4.1 | 5.3 | 71% | 121% |
| Control | 13 | 14.4 | 14.7 | 11% | 13% |
| 28 | 12 | 13.9 | 14.2 | 16% | 18% |

For both Examples 19 and 20, Y-value (white) is measured by ASTM E1331-15; Y-value (black) is measured by ASTM E1331-15, contrast ratio (C/R) is measured by ASTM D2805; 60 gloss is measured by ASTM D523-14; 85 Sheen is measured by ASTM D523-14 and Burnish is measured by ASTM D6736-08. In all examples and throughout this disclosure, unless otherwise specified, all measurements herein are made at about 23±1° C. and about 50% relative humidity.

All publications, patent applications, and issued patents mentioned herein are hereby incorporated in their entirety by reference. Citation of any reference is not an admission regarding any determination as to its availability as prior art to the claimed disclosure.

The dimensions and values disclosed herein are not to be understood as being strictly limited to the exact numerical values recited. Instead, unless otherwise specified, such as dimension is intended to mean both the recited value and a functionally equivalent range surrounding that value. For example, a dimension disclosed as "40 mm" is intended to mean "about 40 mm".

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

We claim:

1. A latex paint composition comprising
 a solvent, at least one first polymeric binder, optional pigment particles, and a plurality of discrete opacifying cluster particles;
 wherein each discrete opacifying cluster particle includes cluster components and a second polymeric binder, wherein the second polymeric binder is a latex binder, wherein the second polymeric binder coalesces cluster components into a generally homogeneous particle, and further wherein the second polymeric binder is the same as or different from the at least one first polymeric binder;
 wherein the cluster components include discrete polymeric particles each defining a closed void volume therein, a plurality of optional inorganic pigment particles, and a plurality of extender pigment particles;
 wherein a porosity of the second polymeric binder defines a binder void volume; and
 wherein each discrete opacifying cluster particle comprises a total void volume including a total closed void volume of all the discrete polymeric particles closed void volumes and the binder void volume of the second polymeric binder.

2. The latex paint composition according to claim 1, wherein a pigment volume concentration of the discrete opacifying cluster particles in the latex paint composition is below the critical pigment volume concentration.

3. The latex paint composition of claim 1, wherein the total void volume is from about 1% to about 35% by volume of the discrete opacifying cluster particles.

4. The latex paint composition of claim 1, wherein an average closed void volume of each discrete polymeric particle is about 0.4 microns to about 0.7 microns in size.

5. The latex paint composition according to claim 1, wherein the optional pigment particles includes one of inorganic pigment particles, additional discrete polymeric particles each defining a closed void volume therein not coalesced within the discrete opacifying cluster particles, extender pigment particles not coalesced within the discrete opacifying cluster particles, and mixtures thereof.

6. The latex paint composition according to claim 5, wherein the latex paint composition, when dried, includes about 50 to about 85 volume percent of the first polymeric binder, about 0 to about 45 volume percent extender pigment particles not coalesced within the discrete opacifying cluster particles, about 0 to about 20 volume percent discrete polymeric particles each defining a closed void volume therein not coalesced within the discrete opacifying cluster particles, about 0 to about 20 volume percent inorganic pigment particles, and about 5 to about 50 volume percent discrete opacifying cluster particles.

7. The latex paint composition according to claim 1, wherein each discrete opacifying cluster particle has an outer surface defined at least by a portion of the second polymeric binder and wherein the outer surface has a surface porosity.

8. The latex paint composition according to claim 7, wherein the surface porosity is formed by interstices each averaging in size from about 0.050 microns to about 0.150 microns.

9. The latex paint composition according to claim 1, wherein a glass transition temperature of the discrete polymeric particles in the discrete opacifying cluster particles is greater than a glass transition temperature of the second polymeric binder in the discrete opacifying cluster particles.

10. The latex paint composition of claim 1, wherein each discrete opacifying cluster particle has an average particle size from about 5 microns to about 44 microns.

11. The latex paint composition of claim 1, wherein each discrete opacifying cluster particle includes from about 1% to about 30% by volume of the second polymeric binder, from about 10 to about 70 percent by volume of the discrete polymeric particles, from about 0 to about 6 percent by volume of the inorganic pigment particles; and the balance being the extender pigment particles.

12. The latex paint composition of claim 1, wherein the pigment volume concentration in the discrete opacifying cluster particles is greater than or equal to a critical pigment volume concentration.

13. A latex paint composition exhibiting improved contrast ratio and opacity, the latex paint composition comprising
a solvent, a polymeric latex binder, pigment particles and a plurality of spray dried opacifying cluster particles;
wherein each spray dried opacifying cluster particle includes discrete polymeric particles each defining a closed void volume therein and coalesced into a generally homogeneous particle, optional polymeric binder, optional inorganic pigment particles, and optional pigment extender particles;
wherein each spray dried opacifying cluster particle has a total void volume including a total closed void volume of all the discrete polymeric particle closed void volumes and, when the optional polymeric binder is present in the spray dried opacifying cluster particles, a binder void volume, defined by a porosity of the optional polymeric binder; and
wherein the latex paint composition, when dried as a paint film, exhibits an about 10 to about 35 percentage increase in opacity as compared to a latex paint composition with the same level of the pigment particles, optional pigment extender particles, and optional inorganic pigment particles but not including the spray dried opacifying cluster particles, wherein opacity is measured in units of S/mil.

14. The latex paint composition of claim 13, further exhibiting about a 0.01 to about 0.02 unit increase in contrast ratio as compared to a latex paint composition with the same level of the pigment particles, optional pigment extender particles, and optional inorganic pigment particles but not including the spray dried opacifying cluster particles.

15. The latex paint composition of claim 13, wherein the improvement in opacity is exhibited over latex paint compositions with a gloss value from about 0 to about 30 and a sheen value from about 0 to about 30.

16. The latex paint composition of claim 13, wherein the latex paint composition when dried exhibits less than about 20 percent increase in gloss and less than about 50 increase in sheen upon 25 scrub cycles per the procedures of ASTM D6736-01.

17. The latex paint composition of claim 16, wherein the latex paint composition includes less than about 10 weight percent of polyvinyl chloride particles.

18. The latex paint composition of claim 13, wherein the total void volume is from about 1 percent to about 35 percent by volume of the spray dried opacifying cluster particles.

19. The latex paint composition of claim 13, wherein an average closed void volume of each discrete polymeric particle is about 0.4 microns to about 0.7 microns in size.

20. The latex paint composition of claim 13, wherein an average particle size of the spray dried opacifying cluster particles is from about 5 microns to about 44 microns.

21. The latex paint composition of claim 13, wherein each spray dried opacifying cluster particle has an outer surface defined at least by a portion of the polymeric latex binder and wherein the outer surface has a surface porosity.

22. The latex paint composition of claim 21, wherein the surface porosity is formed by one or more interstices each from about 0.050 μm to about 0.150 μm in size.

23. The latex paint composition of claim 13, wherein a glass transition temperature of the discrete polymeric particles is greater than a glass transition temperature of the polymeric latex binder.

24. The latex paint composition of claim 13, wherein each spray dried opacifying cluster particle includes from about 1 percent to about 30 percent by volume of the optional polymeric binder, from about 10 percent to about 70 percent by volume of the discrete polymeric particles, from about 0 percent to about 6 percent by volume of the inorganic pigment particles; and the balance being the optional pigment extender particles.

25. The latex paint composition of claim 13, wherein the pigment volume concentration in the spray dried opacifying clusters is greater than or equal to the critical pigment volume concentration.

26. The latex paint composition of claim 13, wherein the optional pigment extender particles are about 0.1 to about 1 microns in size and are selected from calcium carbonate, clay, silica, talc, and combinations thereof.

27. A latex paint composition exhibiting improved contrast ratio and opacity over a range of gloss values, the latex paint composition comprising
   a solvent, a polymeric latex binder, pigment particles, and spray dried opacifying cluster particles;
   wherein the latex paint composition, when dried as a paint film, exhibits an about 10 to about 35 percentage increase in opacity as compared to a latex paint composition with the same level of the pigment particles but not including the spray dried opacifying cluster particles, wherein opacity is measured in units of S/mil; and
   wherein the improvement in opacity is exhibited with latex paint compositions having a gloss value from about 0 to about 30 and a sheen value from about 0 to about 30.

28. The latex paint composition of claim 27, wherein each spray dried opacifying cluster particle includes: discrete polymeric particles, each defining a closed void volume therein and coalesced into a generally homogeneous particle; optional polymeric binder; optional inorganic pigment particles; and optional pigment extender particles.

* * * * *